United States Patent [19]

Francois

[11] 4,161,059
[45] Jul. 17, 1979

[54] METHOD OF FASTENING TO A BELT
[75] Inventor: Edgar Francois, Bethel, Conn.
[73] Assignee: Uniroyal, Inc., New York, N.Y.
[21] Appl. No.: 814,357
[22] Filed: Jul. 11, 1977
[51] Int. Cl.$^2$ ............................................. B23P 11/00
[52] U.S. Cl. ..................... 29/432; 24/31 H; 29/512; 29/523; 74/231 J; 227/68; 403/408
[58] Field of Search ................ 29/432, 512, 526, 523; 24/31 B, 31 H; 227/58, 61, 54, 68; 403/408; 74/231 J, 216.5

[56] References Cited

U.S. PATENT DOCUMENTS

| | | | |
|---|---|---|---|
| 289,926 | 12/1883 | Norton | 74/231 J X |
| 1,437,245 | 11/1922 | Hinchcliff | 227/68 X |
| 3,093,005 | 6/1963 | Dean | 24/31 B X |
| 3,777,966 | 12/1973 | Green | 29/512 X |
| 3,913,180 | 10/1975 | Pray | 74/231 J X |

FOREIGN PATENT DOCUMENTS 1196062  6/1970  United Kingdom ............. 24/31 B

*Primary Examiner*—Charlie T. Moon
*Attorney, Agent, or Firm*—Charles A. Blank

[57] ABSTRACT

A fastening device for fastening together flexible belts having reinforcing cords therein and a method of fastening in which damage to the reinforcing cords of the belts is minimized. The fastening device may also be utilized to attach a rigid plate having an aperture therein to a flexible belt having reinforcing cords therein to minimize damage to the reinforcing cords of the belt.

4 Claims, 11 Drawing Figures

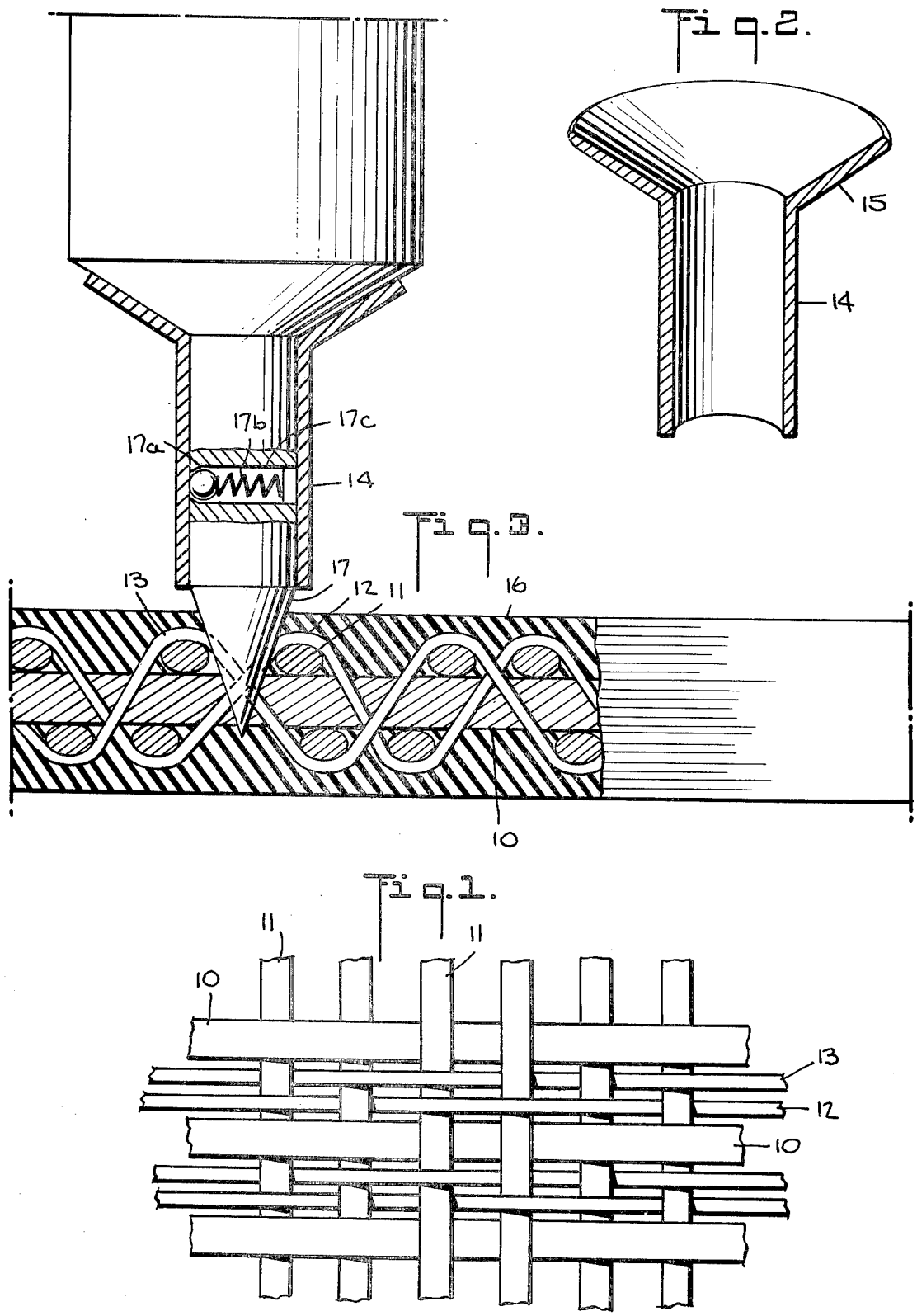

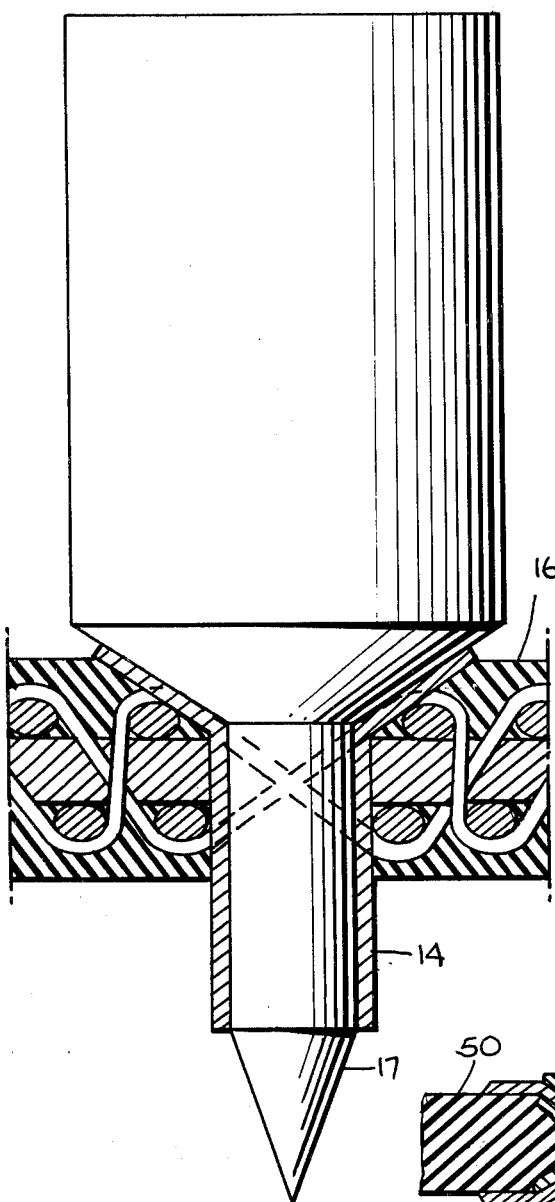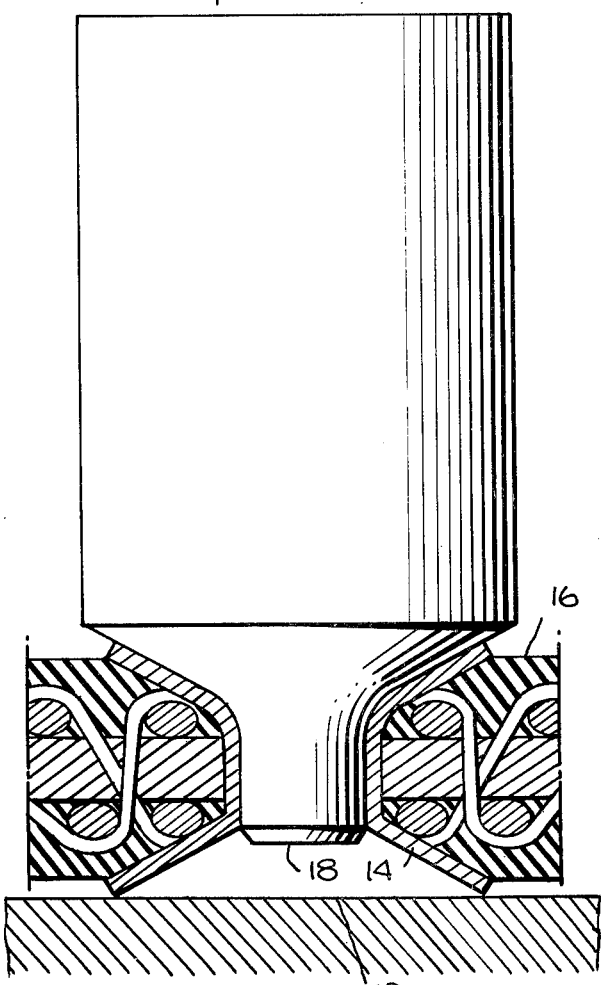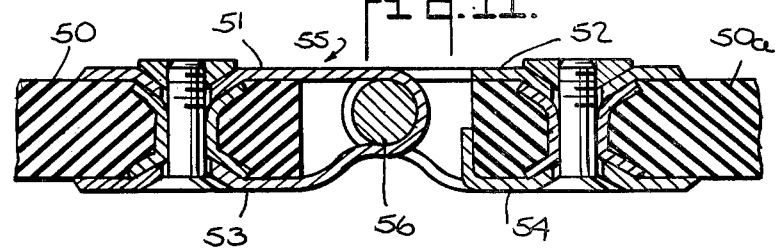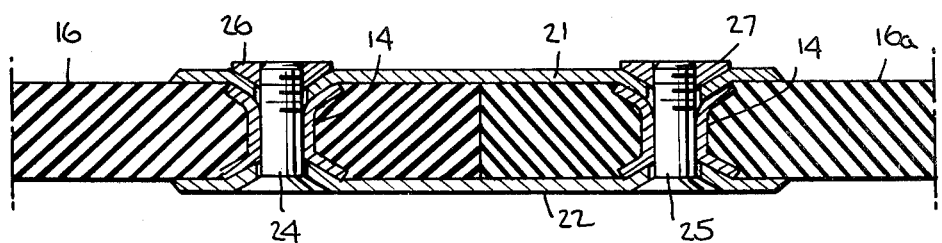

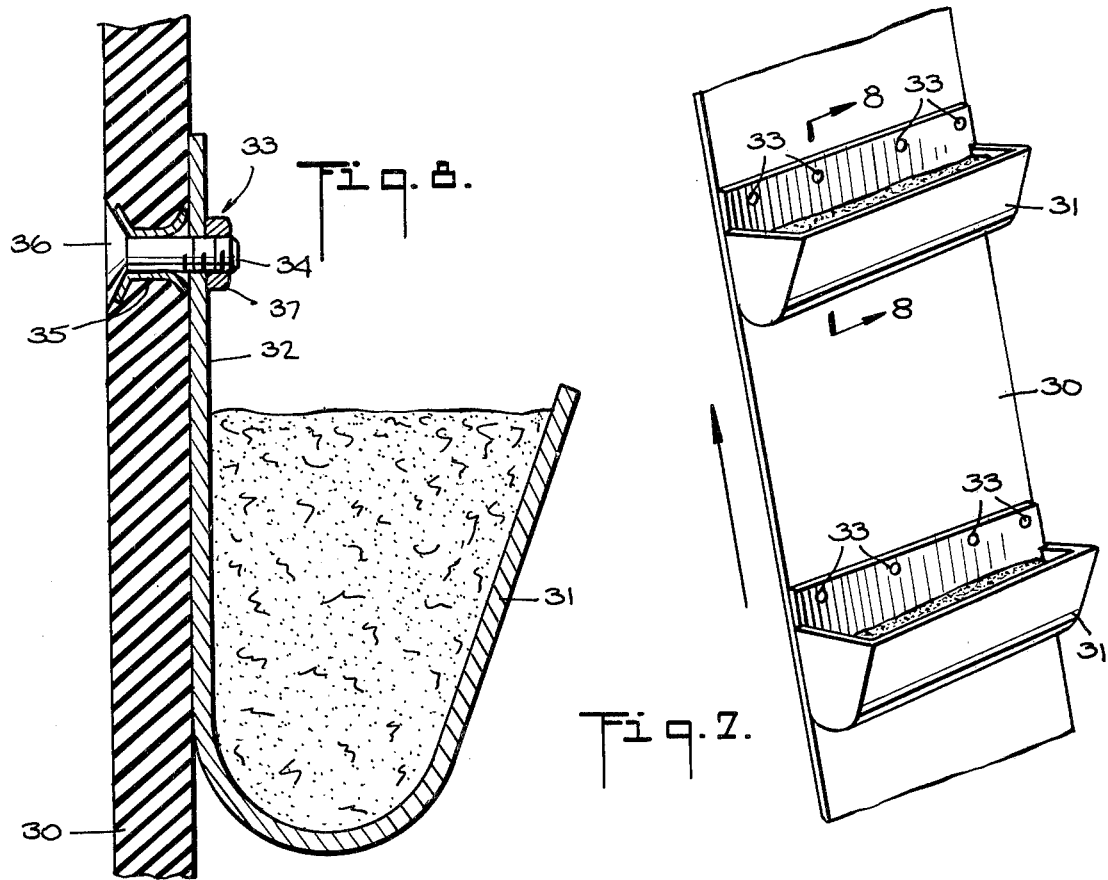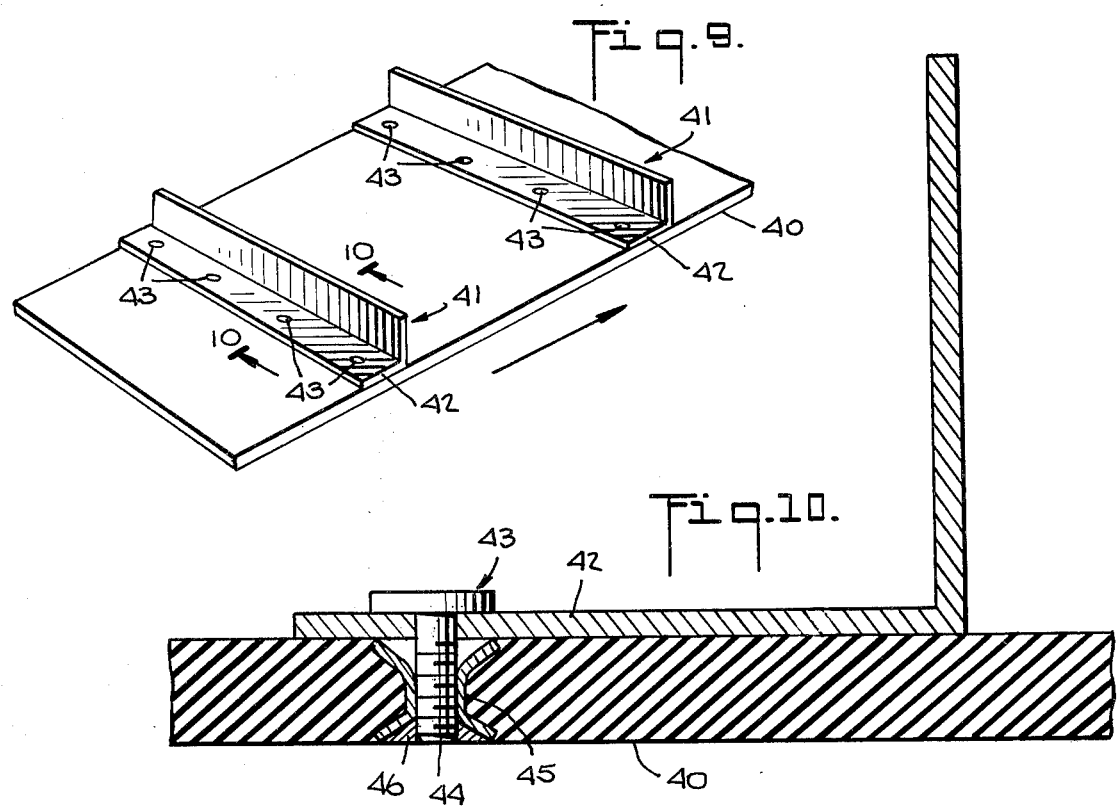

METHOD OF FASTENING TO A BELT

This invention relates to a fastening device and to a method of fastening together flexible belts, such as conveyor belts, having reinforcing cords therein.

As used herein, the term "cords" is intended to include threads, filaments, yarns, wires, cables, bands, braids and the like.

Heretofore, fastening devices for fastening together conveyor belts have used conventional nut and bolt arrangements. It has been common practice to predrill holes through the belt through which a bolt can pass. This drilling caused destruction of the internal reinforcing cords at that location, reducing the strength of the belt and the pullout resistance of the fastening device.

It is an object of the present invention, therefore, to provide a new and improved fastening device, which avoids the above-mentioned disadvantage of prior such devices.

It is another object of the invention to provide a new and improved fastening device which has increased pullout resistance.

It is another object of the invention to provide a new and improved method of fastening together flexible belts having reinforcing cords therein which minimizes destruction of the reinforcing cords.

It is another object of the invention to provide a new and improved method of fastening a rigid plate to a flexible belt having reinforcing cords therein which minimizes destruction of the reinforcing cords.

In accordance with the invention, a fastening device for attaching a rigid plate having an aperture therein to a flexible belt having reinforcing cords therein comprises an aperture in the belt and a sleeve in the aperture of the belt. The aperture of the belt and the sleeve therein are positioned to minimize breaking of the reinforcing cords of the belt. The fastening device also includes a bolt extending through the aperture of the plate and through the sleeve. The fastening device also includes a nut on the bolt tightening the belt and plate together.

Also in accordance with the invention, a fastening device for fastening together flexible belts having reinforcing cords therein comprises an aperture in each of the belts and a sleeve in the aperture of each belt. Each of the apertures and each of the sleeves therein is positioned to minimize breaking of the reinforcing cords of the belts. The fastening device also includes reinforcing plate means on each side of the belts and extending from one belt to the other and having apertures aligned with the apertures of the belts. The fastening device also includes a bolt extending through each of the sleeves and the aligned apertures of the plate means. The fastening device also includes a nut on each of the bolts tightening the belts and plate means together.

Also in accordance with the invention, the method of fastening together flexible belts having reinforcing cords therein comprises piercing each belt with a piercing tool having a sleeve thereon to form an aperture in each belt, thereby positioning a sleeve in each of the apertures formed in the belts. The piercing tool is effective to minimize breaking of the reinforcing cords. The method also includes the steps of positioning reinforcing plate means having apertures aligned with the apertures of the belts on each side of the belts and joining the belts by bolting together the plate means and the belts with bolts extending through the sleeves.

Also in accordance with the invention, the method of fastening together a rigid plate having an aperture therein and a flexible belt having reinforcing cords therein comprising piercing the belt with a piercing tool having a sleeve thereon to form an aperture in the belt, thereby positioning a sleeve in the aperture formed in the belt, the piercing tool being effective to minimize breaking of the reinforcing cords. The method also includes the steps of determining the relative positions of the reinforcing plate and the belt to align the aperture of the reinforcing plate and the aperture of the belt and fastening together the plate and the belt with a bolt extending through the aperture of the plate and through the sleeve.

For a better understanding of the present invention, together with other and further objects thereof, reference is had to the following description, taken in connection with the accompanying drawings, and its scope will be pointed out in the appended claims.

Referring now to the drawings:

FIG. 1 is a fragmentary, plan view of a belting fabric which may be utilized to reinforce a belt to be fastened;

FIG. 2 is a sectional view of an insert used in the fastening device of the invention;

FIG. 3 is a sectional view of the FIG. 2 insert positioned on a piercing tool partially piercing a belt with the FIG. 1 fabric therein;

FIG. 4 is a sectional view of the FIG. 2 insert positioned on the piercing tool and positioned in the belting fabric;

FIG. 5 is a sectional view of the belt having an insert positioned therein and being set in the belt by a setting tool used to form the end of the insert;

FIG. 6 is a fragmentary, sectional view of conveyor belts fastened together by a fastening device constructed in accordance with the invention;

FIG. 7 is a fragmentary, perspective view of elevator buckets fastened to a conveyor belt with fastening devices constructed in accordance with the invention;

FIG. 8 is an enlarged, sectional view of an elevator bucket fastened to a conveyor belt with a fastening device constructed in accordance with the invention taken along line 8—8 of FIG. 7;

FIG. 9 is a fragmentary, perspective view of channels fastened to a conveyor belt with fastening devices constructed in accordance with the invention;

FIG. 10 is an enlarged, sectional view of a channel fastened to a conveyor belt with a fastening device constructed in accordance with the invention taken along line 10—10 of FIG. 9;

FIG. 11 is a fragmentary, sectional view of conveyor belts fastened together by a fastening device constructed in accordance with the invention and including a hinged fastener.

Referring now more particularly to FIG. 1 of the drawings, there is represented, for example, a belting fabric such as described in U.S. Pat. No. 3,148,710. The belting fabric has a plurality of parallel warps 10 and a plurality of parallel wefts 11 transversely positioned above and below the warps 10. Two binders 12, 13, are provided between each of the adjacent warps 10. The binders 12, 13 interlace the wefts 11 above and below the warps 10. This fabric is suitable for reinforcing single ply belts. The fabric described in U.S. Pat. No. 3,556,892 is suitable for multi-ply belts which, for example, might also be used with a fastening device of the present invention. The invention may be used in connection with single ply or multi-ply belting fabric of any description.

Referring now more particularly to FIG. 2 of the drawings, there is represented, in section, a sleeve for positioning in an aperture of a flexible belt having reinforcing cords therein, the aperture of the belt and the sleeve therein being positioned to minimize breaking of the reinforcing cords of the belt. The sleeve 14 preferably is a hollow metal sleeve preferably having a preformed end 15 at one end thereof. The cylindrical body portion of the rivet may have a length which is preferably slightly greater than the thickness of the belt to which the fastener is to be applied. A soft metal is preferred for the insert, for example, aluminum, copper or brass. For use with ¼ inch diameter bolt, the inner diameter of the insert may be, for example, 9/32 inch to provide clearance. The wall thickness of the insert preferably is in the range of 0.015 to 0.060 inch, or example, 0.020 inch. If the wall thickness of the cylindrical body portion is increased above 0.020 inch, it would be desirable to provide a chamfer on the cylindrical end to provide easy insertion through the belt and prevent cord damage.

Referring now more particularly to FIGS. 3 and 4, the method of fastening together flexible belts having reinforcing cords therein comprises piercing each belt 16 with a piercing tool 17 of, for example, steel having a sleeve thereon to form an aperture in each belt, thereby positioning a sleeve in each of the apertures formed in the belts. The piercing tool 17 may hold the sleeve in position by a suitable mechanical means such as a spring-loaded ball 17b in a plug 17c inside the tool 17. The piercing tool 17 is effective to minimize breaking of the reinforcing cords 10, 11 and binders 12, 13 because the pointed tool 17 when driven through the belt will probably pass between the reinforcing cords 10, 11 and binders 12, 13. However, if the piercing tool 17 is in direct alignment with one of the reinforcing cords 10, 11 and binders 12, 13 and if the piercing action is sufficient to rupture that cord or binder, it will rupture only that single cord or binder. Thus, the damage done to the strength of the belting fabric is none or negligible. The sleeve 14 then slides through the material, for example, natural or synthetic elastomeric material, of the belt without rupturing any, or at most, a minimal number of the reinforcing cords and binders. This step is performed without predrilling any hole through the belt. The piercing tool 17 is then removed leaving the sleeve 14 in the belt.

With the metal sleeve 14 extending below the lower surface of the belt, the belt is then turned over with the metal sleeve extending above the belt. The method preferably includes the step of flaring the end of each sleeve 14. This may be accomplished by using a setting tool 18 to flare the upper end of the sleeve 14 against the tool 18. If the unflared end of the sleeve 14, after being driven through the belt, is flushed with the lower surface of the belt or is only slightly below the lower surface of the belt, it may not be necessary to use the setting tool to flare the end of sleeve 14.

As represented in FIG. 6, the method includes the steps of positioning reinforcing plate means comprising plates 21, 22 having apertures aligned with the apertures of the belts 16, 16a on each side of the similar belts 16, 16a, and joining the belts 16, 16a by bolting together the plates 21, 22 with bolts 24, 25 extending through the sleeves 14. The bolts 24, 25 are secured by nuts 26, 27 to tighten the belts and plates together. The flared ends of the sleeves 14 are then embedded in the belts.

Referring now more particularly to FIG. 7 of the drawings, there is represented an inclined conveyor belt 30 having buckets 31, 31 attached thereto by fastening devices 33 constructed in accordance with the invention. The bucket 31 has a rigid back plate 32 attached to one side of the belt 30 represented in FIG. 8, by a bolt 34 extending through sleeve 35 and having a head 36 wider than the sleeve on the other side of the belt and tightened against the plate by a nut. The sleeve 35 may be similar to the sleeve 14 of FIG. 6. The belt 30 has reinforcing cords and binders (not shown) which may be similar to the FIG. 1 belting fabric and the belt 30 may be similar to the belts 16, 16a. The method of fastening together the rigid plate 32 having an aperture therein and a flexible belt having reinforcing cords therein comprises piercing the belt 30 with a piercing tool having a sleeve 35 in a manner similar to that previously described in connection with FIGS. 3 and 4 to form an aperture in the belt, thereby positioning the sleeve in the aperture formed in the belt. As previously described, the piercing tool is effective to minimize breaking of the reinforcing cords. The sleeve 35 preferably has one flared end similar to the sleeve 15 when positioned in the aperture and the method preferably includes the step of flaring the other end of the sleeve in a manner similar to that described in connection with FIG. 5. The method also includes the step of determining the relative positions of the reinforcing plate and the belt to align the aperture of the reinforcing plate and the aperture of the belt. The method also includes the step of fastening together the plate 32 and the belt 30 with a bolt 34 extending through the aperture of the plate and through the sleeve 35.

Referring now more particularly to the FIG. 9, there is represented a horizontal belt 40, which may be similar to the belt 30, having rigid metal channels 41 with rigid plates 42 attached to the belt 40 by fastening devices 43 constructed in accordance with the invention. As represented in FIG. 10, a bolt 44 extends through a sleeve 45 similar to the previously described sleeves and is tightened against the plate 42 by a nut 46.

Referring now more particularly to FIG. 11, there is represented, in section, a fastening device constructed in accordance with the invention for fastening together two belts 50, 50a similar to belts 16, 16a of FIG. 6 in which the reinforcing plate means 51, 52, 53, 54 on each side of the belts comprise a hinged fastener 55, for example, a flexible hinged fastener made by Flexible Steel Lacing Company under the trademark Flexco Hinged No. 550 1. The hinged fastener 55 has a hinged pin 56. The other members of the fastening device of FIG. 11 are similar to those of the FIG. 6 device and the method of fastening together the FIG. 11 belts is similar to the method described in connection with FIG. 6.

While there have been described what are at present considered to be the preferred embodiments of this invention, it will be obvious to those skilled in the art that various changes and modifications may be made therein without departing from the invention, and it is, therefore aimed, to cover all such changes and modifications as fall within the true spirit and scope of the invention.

I claim:

1. The method of fastening together flexible belts having reinforcing cords therein comprising:

piercing each belt with a piercing tool having a sleeve thereon to form an aperture in each belt, thereby positioning a sleeve in each of said apertures formed in said belts, said piercing tool being effective to minimize breaking of said reinforcing cords;

terminating the ends of each of said sleeves substantially at the surfaces of each belt;

positioning reinforcing plate means having apertures aligned with said apertures of said belts on each side of said belts; and joining said belts by bolting together said plate means and said belts with bolts extending through said sleeves.

2. The method in accordance with claim 1 in which each of said sleeves has one flared end when positioned in said apertures and in which the step of terminating the ends of each of said sleeves substantially at the surfaces of each belt includes the step of flaring the other end of each of said sleeves.

3. The method of fastening together a rigid plate having an aperture therein and a flexible belt having reinforcing cords therein comprising:

piercing said belt with a piercing tool having a sleeve thereon to form an aperture in said belt; thereby positioning the sleeve in said aperture formed in said belt, said piercing tool being effective to minimize breaking of said reinforcing cords;

terminating the ends of said sleeve substantially at the surface of the belt;

determining the relative positions of said rigid plate and said belt to align said aperture of said rigid plate and said aperture of said belt;

and fastening together said plate and said belt with a bolt extending through said aperture of said plate and through said sleeve.

4. The method in accordance with claim 3 in which said sleeve has one flared end when positioned in said aperture and in which the step of terminating the ends of said sleeve substantially at the surface of the belt includes the step of flaring the other end of said sleeve.

* * * * *